United States Patent [19]

O'Neel

[11] Patent Number: 5,067,243

[45] Date of Patent: Nov. 26, 1991

[54] LAMINATED ADHESIVE CORE CHAIN SAW GUIDE BAR WITH CONTAINMENT AND SPACING WIRE

[75] Inventor: Timothy H. O'Neel, Milwaukie, Oreg.

[73] Assignee: Blount, Inc., Portland, Oreg.

[21] Appl. No.: 673,413

[22] Filed: Mar. 22, 1991

[51] Int. Cl.[5] ...................... B27B 17/00; B23D 57/00; B29C 67/00

[52] U.S. Cl. ........................................ 30/387; 30/383; 264/46.5

[58] Field of Search .............. 30/383, 384, 387, 123.4; 264/46.5, 46.4

[56] References Cited

U.S. PATENT DOCUMENTS

| | | | |
|---|---|---|---|
| 3,279,508 | 10/1966 | Ehlen et al. | 30/387 |
| 3,301,283 | 1/1967 | Merz | 30/387 |
| 4,138,813 | 2/1979 | Harada et al. | 30/387 |
| 4,393,590 | 7/1983 | Pantzar | 30/387 |

*Primary Examiner*—Douglas D. Watts
*Assistant Examiner*—Paul M. Heyrana, Sr.
*Attorney, Agent, or Firm*—Robert L. Harrington

[57] ABSTRACT

A chain saw guide bar assembly includes opposing outer laminates in spaced relation as defined by a wire structure lying generally about the periphery of the laminates, but spaced inwardly of the edge boundary thereof whereby a saw chain groove formation results as defined by an exposed or outward facing portion of the wire structure and exposed portions of the inner surfaces of the outer laminates. The wire structure advantageously provides, in combination with the outer laminates, a containment cavity for a foam-adhesive core laminate which expands upon curing to fill the cavity and to adhere to the inner surfaces of the outer laminates. A very rigid yet lightweight chain saw bar results with less production complexity and cost relative to that of other core laminate chain saw bars.

6 Claims, 3 Drawing Sheets

LAMINATED ADHESIVE CORE CHAIN SAW GUIDE BAR WITH CONTAINMENT AND SPACING WIRE

FIELD OF THE INVENTION

This invention relates to the structure and method for producing guide bars for chain saws, and more particularly to adhesive core laminated saw chain bars.

BACKGROUND OF THE INVENTION

A chain saw includes three basic components: a powerhead, a guide bar, and a cutting chain. The power head includes a motor that drives a sprocket. The guide bar attaches to and extends outwardly from the sprocket of the power head. The chain encircles the guide bar and the sprocket engages and moves the chain about the guide bar for cutting operation.

The guide bar is typically an oval-shaped metal plate defining along its edge an oval path for the cutting chain. The plate or bar is typically about 0.150 inch thick and the path around the bar edge is characterized by a center groove of about 0.050 inch width flanked by side rails also of about 0.050 inch width. The saw chain is made up of side links and center links. Tang portions extend from the center links into the groove and ride in the groove to assure entrainment of the saw chain around the guide bar periphery. The side links rest against the top of the side rails.

Early versions of the guide bar were produced from a single thickness metal plate, e.g., a 0.150 inch thick plate with the center groove around the bar edge being machine cut. The metal plate material and the process of cutting the groove are high-cost items and have been for many years the target of development efforts to reduce the overall cost of a chain saw. A secondary factor concerns the weight of the chain saw and the solid steel bar contributes substantially to that weight.

Out of these development efforts came the laminated saw chain bar. Using the above example, it will be appreciated that two 0.050 inch thick outer side laminates and a 0.050 inch center or core laminate, properly configured and assembled, will produce the oval-shaped bar with an edge groove. The total materials cost is somewhat reduced but, more importantly, the expensive groove cutting operation is eliminated. Added to the production cost, however, is the cost of fastening the laminates together, typically by spot welding.

It has long been recognized that the center or core laminate does not require the high strength characteristics of steel. Numerous proposals have been made to replace the core with a lighter, less expensive material. Examples of such developments are described in U.S. Pat. Nos. 3,473,581 (Merz), 3,191,646 (Merz), 4,693,007 (Apfei), and 4,383,590 (Pantzar).

These prior proposals reduce weight and materials cost, but add new problems that have generally resulted in as high or higher total production cost. Fastening the outer laminates in the appropriate relative spacing is a major consideration. Also, not previously discussed, is the desirability of forming the grooves so that the oil for lubrication can be injected into the groove and available for the various sliding components, i.e., the side links sliding on the top of the side rails and tang portions sliding along the sides of the bar groove.

U.S. Pat. No. 3,416,578, issued Dec. 17, 1968 to F. T. Irgens, proposes a reduced weight chain saw bar having outer side plates separated by a spacer plate. The spacer plate is perforated to reduce overall saw bar weight. A channel member is mounted intermediate the side plates and about the periphery of the structure to define a saw chain groove. The width of the spacer plate and channel member cooperatively define the relative spacing of the outer side plates.

A recent advance in the production of light weight chain saw bars is the foam core saw chain bar described in U.S. Pat. No. 4,885,843 issued Dec. 12, 1989 to Kelsay, III et al and assigned to the assignee of the present invention. The entire disclosure of U.S. Pat. No. 4,885,843 is incorporated herein by reference. Production of the described foam core bar requires placement of a bifurcated core forming plate between the outer laminates to define an adhesive receiving space therebetween. The receiving space extends to near the edge boundary of the outer laminates, but is spaced inwardly from the edge boundary by a distance corresponding to a desired groove depth. After the foam core material cures, the forming plate must be removed in a final production step. A saw chain groove about the periphery of the chain saw bar remains with the exposed foam core defining the bottom of the saw chain groove.

SUMMARY OF THE INVENTION

The structure and method contemplated by the present invention utilizes an adhesive material in combination with a formed wire structure for relative spacing of the outer laminates as well as containment of the adhesive core during production.

In accordance with a preferred embodiment of the present invention a laminated adhesive core bar is constructed by mounting a formed wire structure intermediate the outer laminates whereby the wire structure dictates the relative spacing of the outer laminates and defines, in combination with the outer laminates, an interior fluid adhesive receiving cavity. The form of the wire structure corresponds generally in shape to the edge boundary of the outer laminates, but is spaced inwardly therefrom. A saw chain groove results about the periphery of the saw chain bar as defined at its base by the exposed portion of the wire structure and along its sides by the exposed interior surface of the spaced outer laminates. The wire structure thereby serves the dual production functions of laminate spacing and a fluid adhesive, or foam, core containment, but need not be removed. Indeed, the wire structure remains and contributes to the overall rigidity of the resulting guide bar structure.

BRIEF DESCRIPTION OF THE DRAWINGS

The present invention will be more clearly understood by reference to a particular embodiment of the present invention as presented in the following detailed description and drawings wherein.

DETAILED DESCRIPTION

Figure 1:
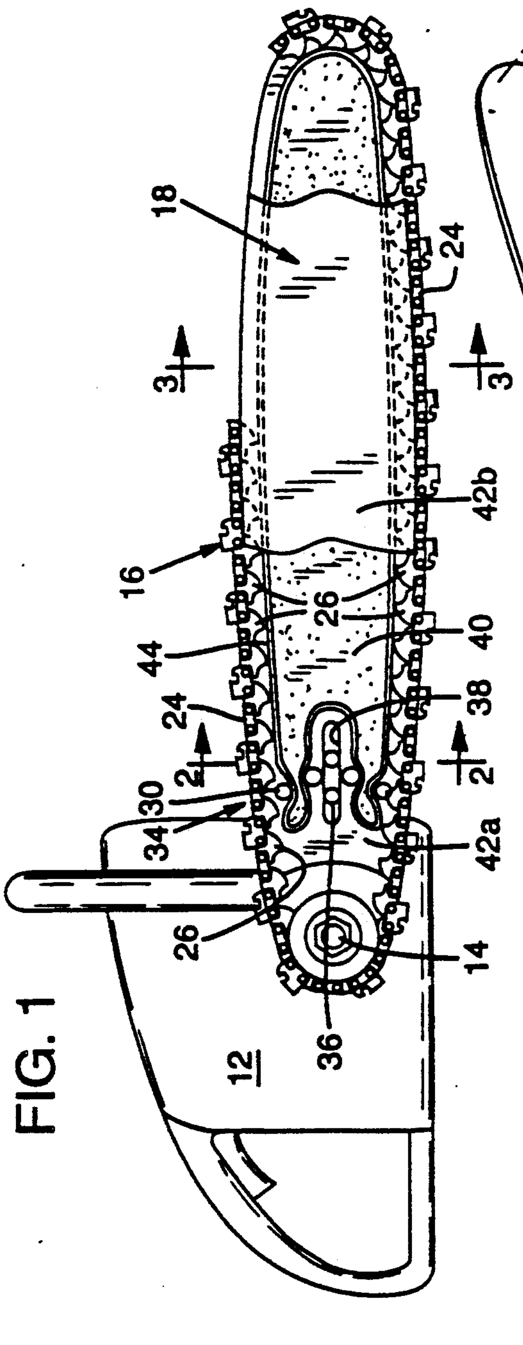
FIG. 1 illustrates a chain saw having a guide bar in accordance with the present invention.

FIG. 1 illustrates a typical chain saw but including a laminated guide bar of the present invention. A power head 12, including the various controls, drives a drive sprocket 14. The drive sprocket 14 in turn drives a saw chain 16 entrained about the edge or periphery of a guide bar 18.

Figure 2:
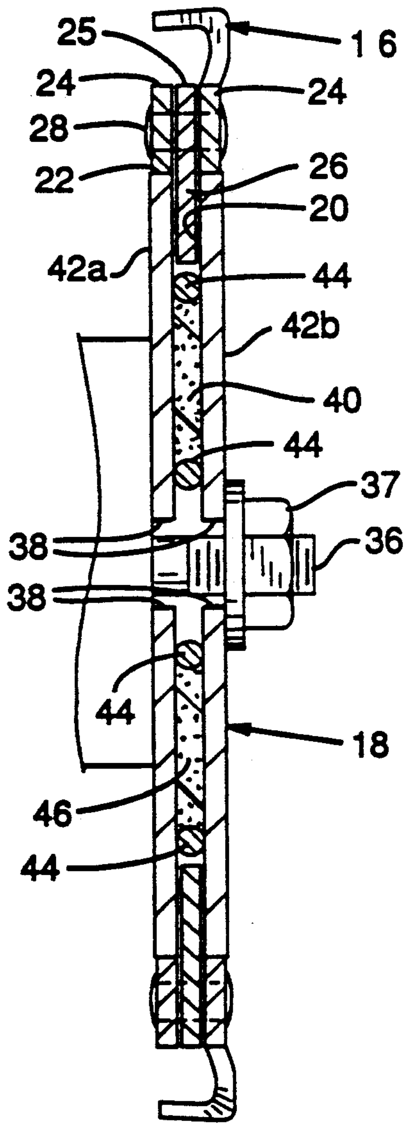
FIG. 2 is a section view of the guide bar and saw chain of FIG. 1 as taken along lines 2—2 of FIG. 1.
Figure 3:
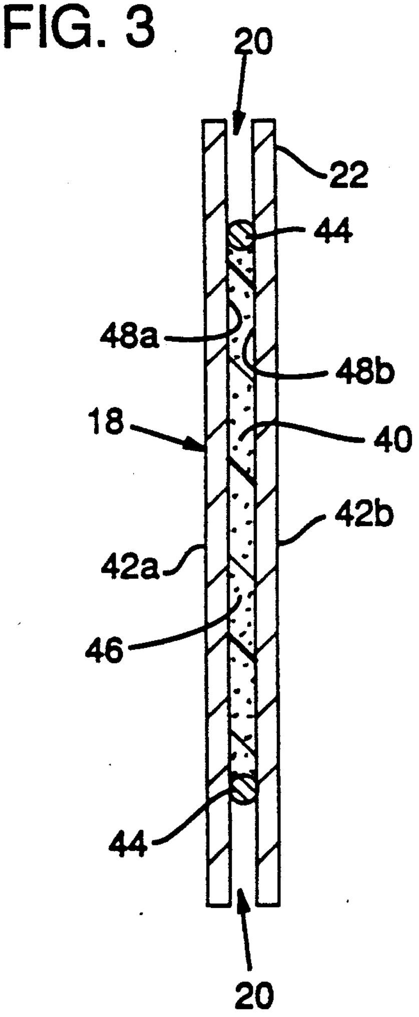
FIG. 3 is a section view of the guide bar of FIG. 1 as taken along lines 3—3 of FIG. 1, but without the saw chain.

The guide bar 18 is shown in cross section in FIGS. 2 and 3. FIG. 3 shows the guide bar without the saw chain 16 and it will be noted that the periphery of bar 18 includes a groove 20 flanked by the side rails 22. As noted from FIG. 2, the saw chain 16 is made up of side links 24 and center links 25 with tang portions 26 extending into the groove 20. Rivets 28 pivotally couple the chain links together. Tang portions 26 provide the dual function of engaging the teeth of the sprocket 14 as well as riding in the groove 20 to guide the chain 16 as it is driven around guide bar 18.

The side links 24 of saw chain 16 slide along the outer edge of guide bar 18 on the tops of the side rails 22 and tangs 26 slide along the inner sides of side rails 22 within the bar groove 20. These surfaces are lubricated by injecting oil into holes 30 from power head 12. The oil collects in a pool formation 34 in the groove 20 and near hole 30. The tang portions 16 pass through formation 34, pick up the oil and spread the oil along the groove 20 and into the chassis of the chain. Both upper and lower oil holes 30, each within a corresponding one of outer laminates 42*a* and 42*b* and each with corresponding pool formations 34, are provided because the bar is typically reversible to balance the wearing of the bar edges. Only the upper hole 30 is used for lubrication.

The guide bar 18 mounts to the power head 12 by bolts 36 extending through a rear slot 38 in the guide bar 18. This bolt 36 and slot 38 arrangement enables the operator to loosen and tighten the chain, i.e., by moving the bar toward or away from the drive sprocket 14. The bar !8 is held in place by clamping the bar 18 to the power head 12 through the tightening of nuts 37 (FIG. 2). Adjustment holes 39 (FIG. 4) adjacent slot 38 provide access to a rack arrangement (not shown) for moving bar 18 relative to sprocket 14 prior to tightening nuts 37.

The above details are common to laminated guide bars as mounted on chain saws. Whereas they do not form a part of the invention, they do impact on certain of the features of the invention which will now be explained.

The preferred embodiment of the present invention concerns the provision of a light weight, inexpensive curable fluid adhesive core laminate 40 provided between two steel (metal) outer laminates 42*a* and 42*b*, in combination with a formed wire 44 serving the dual functions of containing the core laminate 40 during production and spacing outer laminates 42 during both production and use. The core laminate 40 desirably has the properties of being chemically inert to gas and oil and generally impervious to the lubricating oil introduced into groove 20. As will be described below, however, the core laminate 40 is substantially enclosed by the wire 44 and laminates 42*a* and 42*b* and, therefore, not in direct contact with the groove 20 lubricating oil. The laminate 40 must be capable of conforming to the desired configuration of a core laminate while positioned between the outer laminates 42*a* and 42*b*, and in so conforming, it must be capable of strongly adhering to the inner surfaces 48 of outer laminates 42. When formed or cured, it must be strongly resistant to deformation as by compression or tension forces.

A fluid adhesive material found to satisfy these properties is a closed cell polyurethane foam with controlled activation capability. Specifically, one foam material found acceptable is available from Biwax Corporation of Des Plaines, IL. It is recommended as a rigid urethane foam for potting or packaging. The foam resin is identified as Biwax 82.460-R and is activated by a resin-catalyst identified as Biwax 82.460-C. The two parts are thoroughly mixed at a ratio by weight of 54.5 parts of the resin to 45.5 parts of the catalyst. Upon curing, it has a density of about 5 pounds per cubic foot. Generally, the foam is placed within a containment cavity defined by laminates 42 and wire 44 and expands upon curing to fill the containment cavity.

Figure 4:
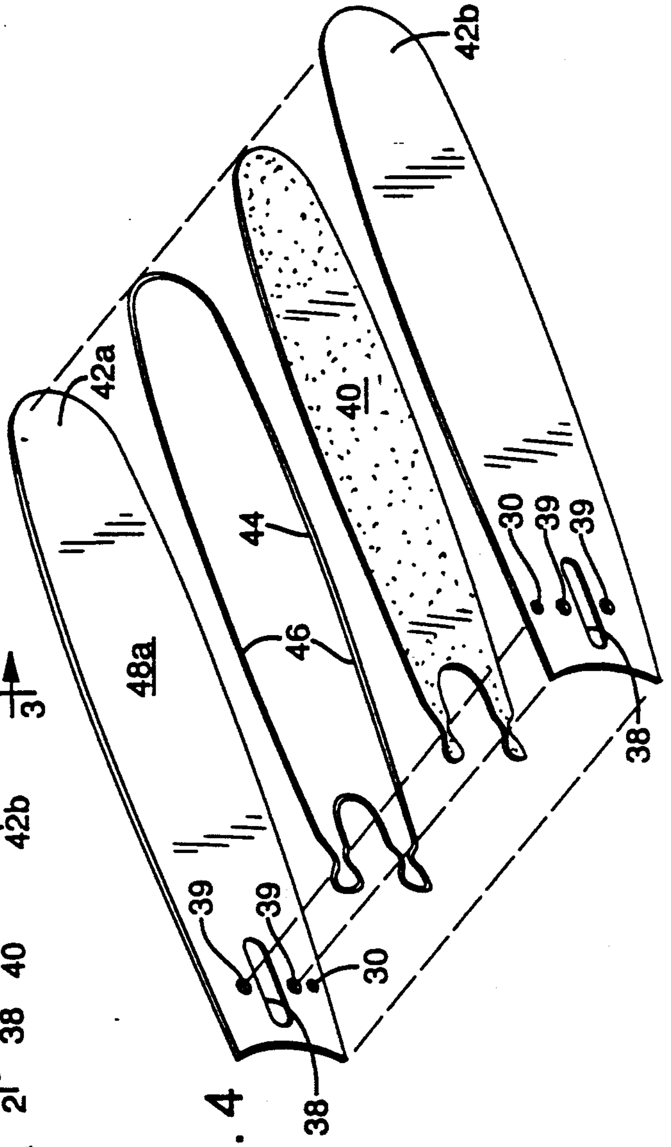
FIG. 4 is an exploded perspective view of the guide bar of FIG. 1 including a foam core portrayed in its final shape after curing.

FIG. 4 is an exploded perspective view of the guide bar 18, showing the core laminate 40 in its final shape after curing. Prior to curing, it will be understood, the core laminate 40 is fluid in character as placed between laminates 42*a* and 42*b*, but expands and becomes rigid upon curing to occupy the cavity 46 defined by the opposing surfaces, i.e. inner surfaces 48*a* and 48*b*, (FIG. 3) of laminates 42*a* and 42*b*, respectively, and wire 44. Outer laminates 42*a* and 42*b* are similar in shape, each including a portion of the slot 38, adjusting holes 39, and respective ones of oil holes 30.

Wire 44 is very rigid and pre-formed as a closed loop to correspond generally in shape to the outer edge boundary of laminates 42*a* and 42*b*, but spaced inwardly therefrom by the desired depth of groove 20. Wire 44 also defines the pool formations 34 adjacent each oil hole 30 and substantially surrounds slot 38. The circular cross-section of wire 44 (FIGS. 2 and 3) maintains the planar character of wire 44 after formation and thereby contributes to consistent spacing of laminates 42, but other cross-sectional shapes for wire 44 may be satisfactory. Laminates 42*a* and 42*b* lie in spaced apart face-to-face relation capturing wire 44 therebetween and defining, in conjunction with wire 44, both the groove 20 and containment cavity 46. More particularly, the unexposed portions of inner surfaces 48*a* and 48*b* together with the unexposed, i.e. interior facing, portion of wire 44 define the containment cavity 46. The exposed portions of surfaces 48*a* and 48*b*, i.e. near the edge boundary of laminates 42*a* and 42*b*, respectively, define the side walls of groove 20 while the exposed, i.e., outward facing, portion of wire 44 defines the bottom of groove 20.

Figure 5:
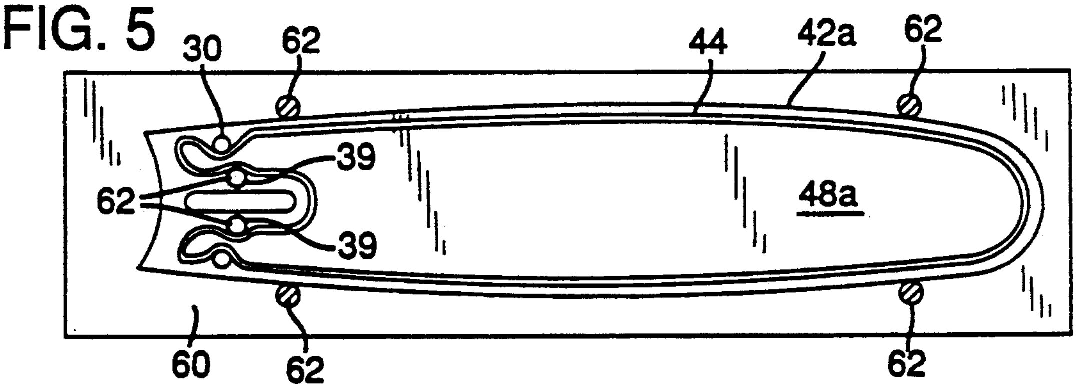
FIGS. 5–8 illustrate manufacturing steps associated with production of the guide bar of FIG. 1.

FIGS. 5–8 illustrate the method of constructing guide bar 18. In FIG. 5, outer laminate 42*a* is placed on a lower press plate 60 and positioned with reference to upstanding threaded registration pegs 62 integral to plate 60. More particularly, six registration pegs 62 are shown in FIG. 5, four around the periphery of laminate 42*a* and two positioned to occupy adjustment holes 39 of laminate 42*a*. pegs 62 thereby accurately position laminate 42*a* with respect to plate 60. It will be appreciated that many registration methods may be used to accurately position laminate 42*a*, and the remainder of the bar 18 assembly, upon plate 60. Wire 44 is then mounted upon laminate 42*a* as by, for example, spot welding with positional reference to pegs 62 so as to accurately position wire 44 in its intended location on laminate 42*a*. More particularly, wire 44 is positioned a consistent distance from the edge boundary of laminate 42*a* to establish a constant groove 20 depth, pool formations 34 of wire 44 are suitably positioned with respect to oil holes 30, and slot 38 is substantially surrounded by wire 44.

Figure 6:
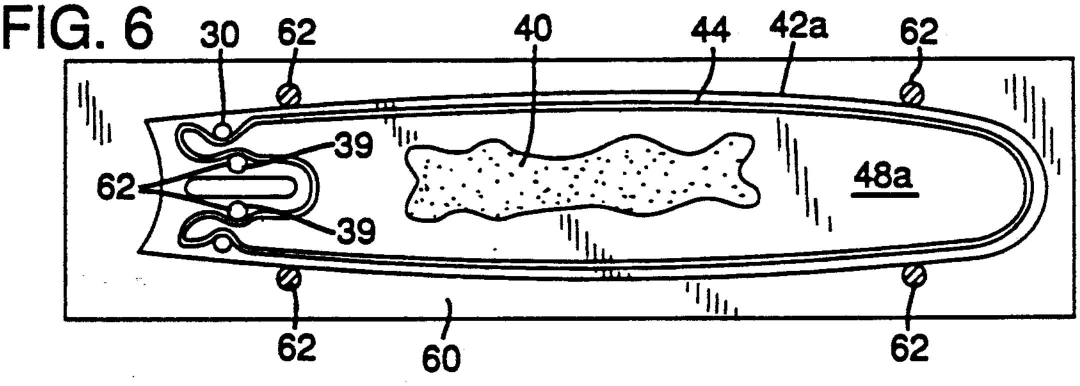

FIG. 6 illustrates placement of fluid adhesive core laminate material 40 upon the surface 48*a* of laminate 42*a* and within the boundary of wire 44. At this point core laminate material 40 has just been mixed in preparation for curing and is substantially fluid, but will begin curing by first expanding and then hardening in a short time. The volume of core laminate material 40 used will depend on the thickness of wire 44 and area enclosed thereby and will, therefore, vary for different saw bar dimensions. Some experimentation as to the precise amount of core laminate 40 needed may be necessary for each saw bar 18 configuration. Although a foam adhesive material is described, it will be recognized that other adhesives may be used also.

Figure 7:
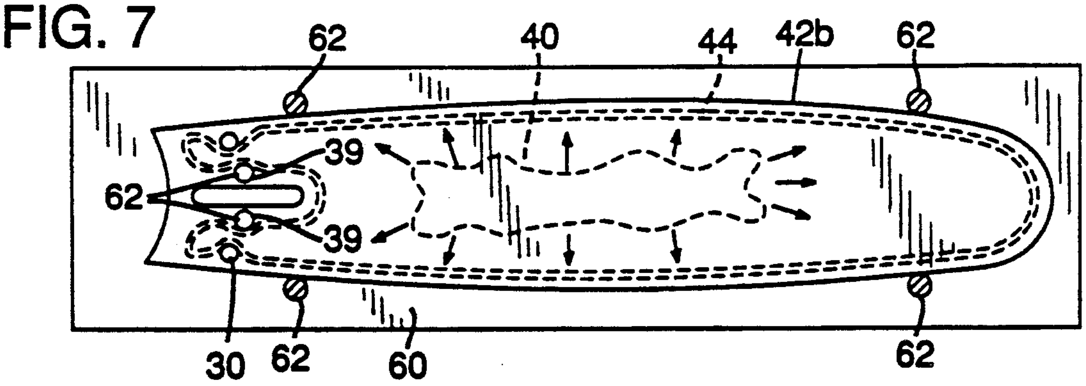

FIG. 7 illustrates placement of laminate 42*b* upon wire 44 immediately after placement of core laminate 40. Registration of laminate 42*b* is achieved by pegs 62, including insertion through adjustment holes 39 of laminate 42*b*, whereby laminates 42*a* and 42*b* are in vertical alignment. As laminate 42*b* comes into contact with core laminate 40 and rests against wire 44, core laminate material 40 begins to spread and occupy the containment cavity 46 now defined by laminates 42*a* and 42*b* and wire 44.

Figure 8:
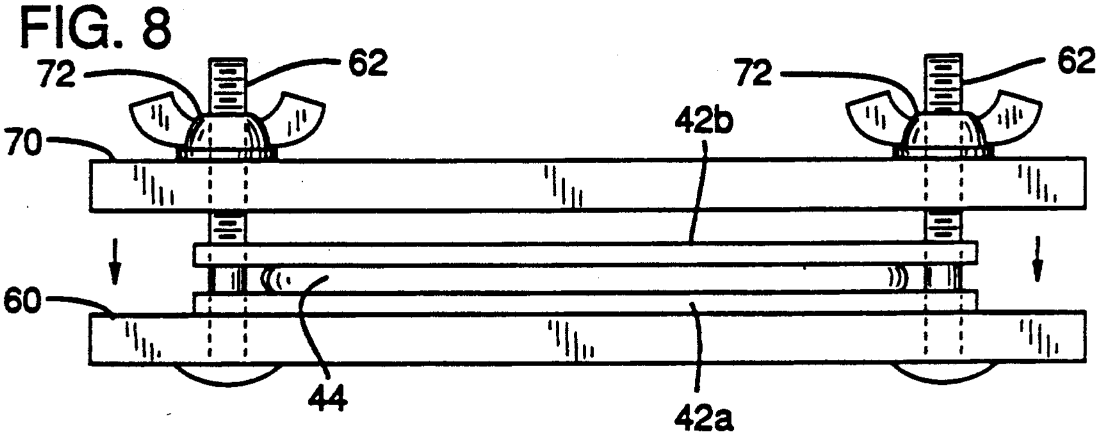

In FIG. 8, an upper press plate 70 is positioned upon laminate 42*b*. Plate 70 includes apertures for accommodating threaded pegs 62. Wing nuts 72 thread upon pegs 62 to bring together plates 60 and 70 and maintain laminates 42*a* and 42*b* in contact with wire 44. Core laminate material 40 is then contained within cavity 46 as it expands and cures. The core laminate material 40 is cured and strongly adheres to the inner surfaces 48*a* and 48*b* to secure the saw bar 18 assembly. In the final production step, wing nuts 72 are loosened and bar 18 is removed.

Modifications to guide bar 18 as are typical in saw chain guide bars may be incorporated into a guide bar according to the present invention by suitably shaping wire 44. For example, some guide bars include a nose sprocket rotatably mounted at the distal end of bar 18. To accommodate the nose sprocket, wire 44 may be shaped to provide a sprocket formation (not shown) at the nose of the bar whereby core laminate 40 would extend to the edge of the sprocket formation leaving a sprocket receiving space between laminates 42*a* and 42*b* at the bar nose.

Because the core laminate 40 bonds together the outer laminates 42*a* and 42*b*, it may be desirable to roughen the inner surfaces 48*a* and 48*b*, e.g., as by sandblasting, to promote greater mechanical gripping. Generally, no other fastening of outer laminates 42*a* and 42*b* is needed.

It may be appreciated that the method of assembling a laminated core guide bar in accordance with the present invention has advantages over prior methods. The wire 44 establishes spacing between outer laminates 42*a* and 42*b* and defines the containment cavity 46. Furthermore, the wire 44 remains within the structure of bar 18 to contribute to overall rigidity and resist compression of core laminate 40 as upon mounting to the power head 12 by tightening of nuts 37. In prior laminated guide bars, such as described in U.S. Pat. No. 4,885,843, a support plate surrounding the mounting slot and equal in thickness to the core laminate was needed to resist the compression force of nut 37. Such a support plate is not needed in a laminated guide bar according to present invention due to the support against compression provided by wire 44, especially in the area surrounding mounting slot 38.

I claim:

1. A laminated chain saw guide bar comprising:
   first and second similarly shaped outer laminates each having an inner surface in face-to-face relation to the other inner surface;
   a wire structure intermediate said outer laminates and contacting said inner surfaces to define a relative spacing therebetween, an exposed portion of said wire structure defining in combination with exposed portions of said inner surfaces a groove about the periphery of said guide bar, an unexposed portion of said wire structure defining in combination with unexposed portions of said inner surfaces an inner core cavity; and
   an adhesive core material occupying said inner core cavity and adhering to said inner surfaces and to said wire structure.

2. A guide bar according to claim 1 wherein said wire structure is a preformed rigid wire structure corresponding generally in shape to the shape of said outer laminates but of lesser dimension whereby a substantial portion of said wire structure may be positioned a given distance from the edge boundary of said outer laminates, said given distance corresponding to the depth of said groove.

3. A guide bar according to claim 1 wherein said adhesive core material comprises a curable fluid material which hardens and adheres to contacting surfaces upon curing.

4. A laminated chain saw guide bar having a saw chain groove about a substantial portion of its periphery, the bar comprising:
   first and second similarly shaped metal outer laminates in face-to-face spaced relation, said spaced relation corresponding to a desired width for said groove;
   a preformed wire structure captured between said outer laminates and corresponding generally in shape to the shape of said outer laminates, a substantial portion of said wire structure being positioned a given distance from the edge boundary of said outer laminates, said given distance corresponding to a desired depth for said groove; and
   an adhesive core laminate occupying a closed cavity defined by opposing faces of said outer laminates and by said wire structure, said core laminate bonding together said outer laminates.

5. A chain saw guide bar according to claim 4 wherein said core comprises a curable liquid material which expands, hardens, and adheres to contacting surfaces upon curing.

6. A chain saw guide bar according to claim 5 wherein said curable liquid material is an adhesive foam material.

* * * * *